US008677763B2

(12) United States Patent
Hatman

(10) Patent No.: US 8,677,763 B2

(45) Date of Patent: Mar. 25, 2014

(54) METHOD AND APPARATUS FOR GAS TURBINE ENGINE TEMPERATURE MANAGEMENT

(75) Inventor: Anca Hatman, Easley, SC (US)

(73) Assignee: General Electric Company, Schenectady, NY (US)

( * ) Notice: Subject to any disclaimer, the term of this patent is extended or adjusted under 35 U.S.C. 154(b) by 872 days.

(21) Appl. No.: 12/400,916

(22) Filed: Mar. 10, 2009

(65) Prior Publication Data

US 2010/0232944 A1 Sep. 16, 2010

(51) Int. Cl.
*F02C 7/12* (2006.01)

(52) U.S. Cl.
USPC .................. 60/782; 60/785; 60/805; 60/806; 415/115; 416/97 R

(58) Field of Classification Search
USPC .................. 60/752, 754, 785, 805, 806, 782; 415/115, 177, 1; 416/96 R, 97 R
See application file for complete search history.

(56) References Cited

U.S. PATENT DOCUMENTS

| | | | | |
|---|---|---|---|---|
| 4,526,226 | A * | 7/1985 | Hsia et al. | 165/109.1 |
| 5,417,545 | A * | 5/1995 | Harrogate | 415/115 |
| 5,486,091 | A | 1/1996 | Sharma | |
| 6,354,797 | B1 * | 3/2002 | Heyward et al. | 415/191 |
| 6,402,458 | B1 | 6/2002 | Turner | |
| 6,554,562 | B2 * | 4/2003 | Dudebout et al. | 415/1 |
| 6,572,330 | B2 | 6/2003 | Burdgick | |
| 6,722,138 | B2 * | 4/2004 | Soechting et al. | 60/785 |
| 6,929,446 | B2 * | 8/2005 | Lu et al. | 415/115 |
| 7,186,085 | B2 * | 3/2007 | Lee | 416/97 R |
| 7,249,934 | B2 * | 7/2007 | Palmer et al. | 416/97 R |
| 2003/0002975 | A1 | 1/2003 | Dudebout | |
| 2007/0017208 | A1 * | 1/2007 | Ralls, Jr. | 60/39.511 |
| 2008/0317585 | A1 | 12/2008 | Lee et al. | |

FOREIGN PATENT DOCUMENTS

| | | |
|---|---|---|
| EP | 1176284 B1 | 1/2008 |
| JP | 08014001 | 1/1996 |
| JP | 2002-138802 A | 5/2002 |

OTHER PUBLICATIONS

Office Action regarding related Application No. JP 2010-047245; dated Nov. 19, 2013; 2 pgs.

* cited by examiner

*Primary Examiner* — William H Rodriguez
*Assistant Examiner* — Steven Sutherland
(74) *Attorney, Agent, or Firm* — Cantor Colburn LLP

(57) ABSTRACT

A turbine engine has a compressor for delivery of compressed air to a combustor. The combustor delivers hot combustion gas through an outlet to a turbine. The turbine includes a nozzle assembly, downstream turbine blades, and shroud assemblies adjacent radially distal ends of turbine rotor blades. The nozzle and shroud assemblies include internal cooling passages for receiving compressed air from the compressor and, cooling air apertures opening through walls of the vanes and shrouds into the hot gas path to release film cooling air. The number of apertures, the aperture area, and the aperture pattern are varied in relation to the circumferential temperature profile of the combustion gas with a higher aperture area and/or higher number of apertures in high temperature regions and a lower aperture area and/or lower number of apertures in low temperature regions.

11 Claims, 4 Drawing Sheets

METHOD AND APPARATUS FOR GAS TURBINE ENGINE TEMPERATURE MANAGEMENT

BACKGROUND OF THE INVENTION

The subject matter disclosed herein relates to gas turbine engines and, more particularly, to temperature management therein.

In a gas turbine engine, air is pressurized in a compressor and mixed with fuel in a combustor for generating hot combustion gas that flows downstream through one or more turbine stages. A turbine stage includes a stationary turbine nozzle having stator vanes that guide the combustion gas through a downstream row of turbine rotor blades. The blades extend radially outwardly from a supporting disk that is powered by extracting energy from the gas.

A first stage turbine nozzle receives hot combustion gas from the combustor that is directed to the first stage turbine rotor blades for extraction of energy therefrom. A second stage turbine nozzle may be disposed downstream from the first stage turbine rotor blades, and is followed by a row of second stage turbine rotor blades that extract additional energy from the combustion gas. Additional stages of turbine nozzles and turbine rotor blades may be disposed downstream from the second stage turbine rotor blades.

As energy is extracted from the combustion gas, the temperature of the gas is correspondingly reduced. However, since the gas temperature is relatively high, the turbine stages are typically cooled by diverting air from the compressor through the hollow vane and blade airfoils as well as sidewalls and shrouds. Since the cooling air is diverted from use by the combustor, the amount of extracted cooling air has a direct influence on the overall efficiency of the engine. It is therefore desired to improve the efficiency with which the cooling air is utilized to improve the overall efficiency of the turbine engine.

The quantity of cooling air required is dependant on the temperature of the combustion gas. Since combustion gas temperature directly affects the gas turbine component capability of meeting operating life requirements, the cooling air requirement for the turbine stages must be effective for withstanding high temperature operation of the engine.

The combustion gas temperature varies temporally over the operating or running condition of the engine and also varies circumferentially based on the location at which the gas is discharged from the outlet of the combustor. Large circumferential temperature variations are particularly present in can-annular combustion systems, where outlets of multiple combustion cans form the annular combustion outlet. The combustion gas temperature peaks in the center of each can outlet while the temperature at the sides of the can outlet is lower due to combustion aft-frame leakage. This spatial temperature variation is typically represented by combustor pattern and profile factors that are conventionally known.

Accordingly, the stationary components of each turbine stage are specifically designed for withstanding the peak combustion gas temperature. Since the segments in each row of vane airfoils, vane sidewalls and shrouds are often similar to each other, the cooling configurations may also be similar. As a result, the cooling configurations are effective for providing suitable cooling at the peak combustion gas temperatures experienced by the individual stages. Each vane airfoil, vane sidewall and shroud is cooled based on the peak temperature on the combustor pattern profile. This results in excess cooling for segments located downstream of lower temperature regions of the combustor outlet. Excess cooling translates directly to lower than desired turbine efficiency.

It is therefore desired to provide a gas turbine engine having improved cooling of gas turbine stationary components.

BRIEF DESCRIPTION OF THE INVENTION

In one embodiment of the invention, a turbine engine comprises a turbine, a combustor, and a compressor for delivery of compressed air to the combustor. The combustor combusts fuel with the compressed air to deliver hot combustion gas through an outlet to the turbine. Stationary components include a nozzle assembly disposed in the turbine having vanes supported by sidewalls, for directing the hot combustion gas to downstream turbine blades. Cooling passages in the vanes and sidewalls are configured to receive compressed air from the compressor and cooling air apertures open through outer walls of the vanes and sidewalls to release the cooling air. The apertures have an aperture distribution in the vanes and sidewalls related to a temperature profile of the hot combustion gas, with a larger aperture area placed in high temperature regions and a lower aperture area placed in low temperature regions.

In another embodiment of the invention, a turbine engine comprises a turbine, a can-annular combustion system comprising a plurality of circumferentially spaced combustors having circumferentially spaced annular combustor can outlets located upstream of the turbine and a compressor for delivery of compressed air to the combustors. The combustors combust fuel with the compressed air to deliver hot combustion gas through the spaced annular combustor can outlets to the turbine. Stationary components are disposed in the turbine downstream of the spaced annular combustor can outlets and have cooling passages configured to receive compressed air from the compressor. Cooling air apertures open through outer walls of the stationary components to release the cooling air. The apertures have a varied aperture area related to a temperature profile of the hot combustion gas exiting the spaced annular combustor outlets, with a larger aperture area placed in high temperature regions and a lower aperture area placed in low temperature regions.

In yet another embodiment of the invention, a method for cooling stationary vanes, sidewalls and shrouds of a turbine, which receive hot combustion gas from an upstream combustor, is disclosed. The method comprises introducing compressed cooling air from a compressor into cooling air passages extending through the stationary vanes, sidewalls and shrouds and releasing the cooling air through apertures opening through outer walls of the stationary vanes, sidewalls and shrouds. The apertures are located in relation to a temperature profile of the hot combustion gas with a higher aperture area located in high temperature regions and a lower aperture area placed in low temperature regions.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

The present invention relates generally to a gas turbine engine in which a combustor system with multiple combustion cans discharges hot gases into a conventional turbine engine. Combustor aft frames and downstream turbine nozzle and shroud segments have customized cooling patterns and cooling areas that are aligned with the circumferential combustion gas temperature distribution of the combustion cans.

Figure 1:
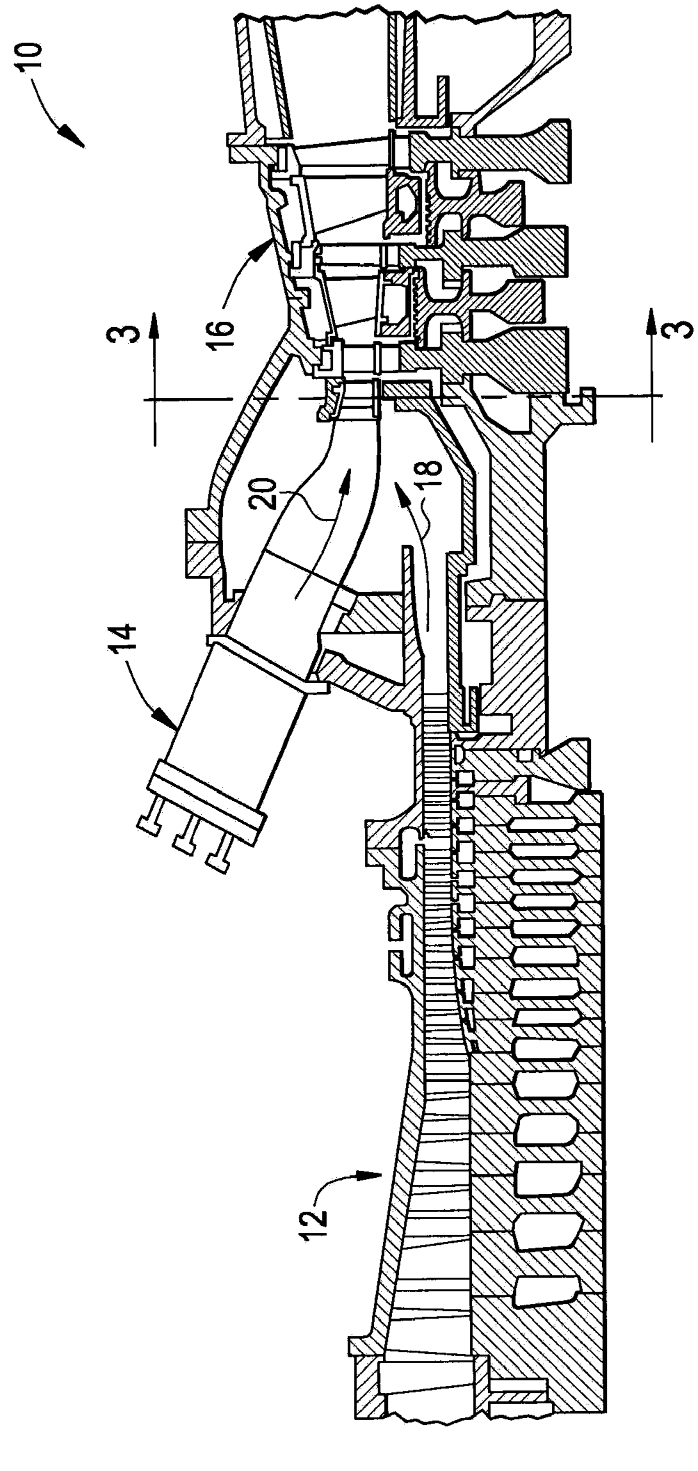
FIG. 1 is an axial sectional view through a portion of an exemplary gas turbine engine in accordance with an embodiment of the present invention.
Figure 2:
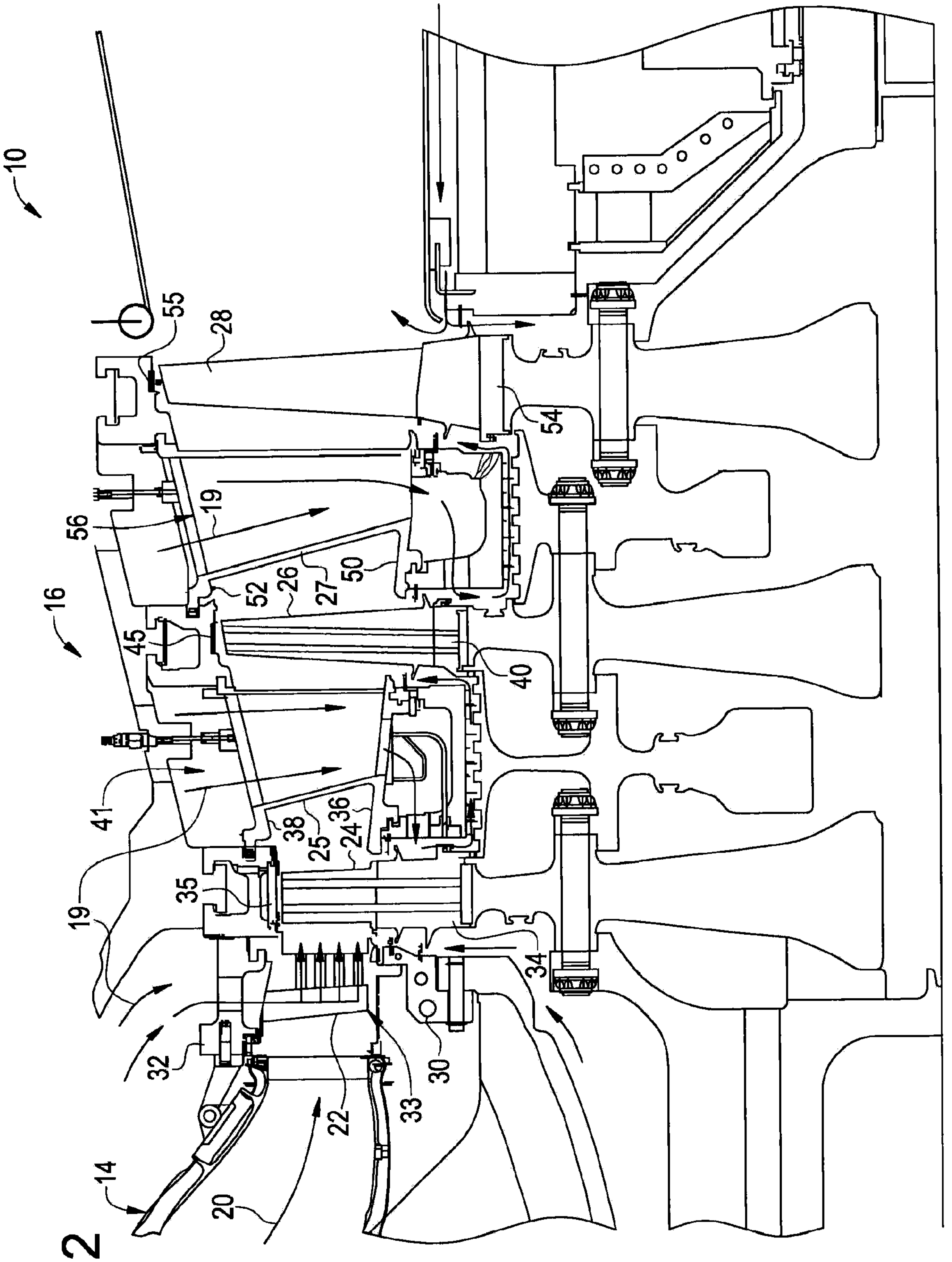
FIG. 2 is an enlarged sectional view through a portion of the gas turbine engine of FIG. 1.

Illustrated in FIGS. 1 and 2 is a portion of a gas turbine engine 10. The engine is axisymmetrical about a longitudinal or axial center line axis and includes, in serial flow communication, a multistage axial compressor 12, a series of circumferentially spaced combustors 14, and a multi-stage turbine 16.

During operation, compressed air 18 from the compressor 12 flows to the combustors 14 that operate to combust fuel with the compressed air for generating hot combustion gas 20. The hot combustion gas 20 exits each combustor through annular combustor cans 15 and flows downstream through the multi-stage turbine 16, which extracts energy therefrom.

As show in FIGS. 1 and 2, an example of a multi-stage axial turbine 16 may be configured in three stages having six rows of air foils 22, 24, 25, 26, 27, 28 disposed axially, in direct sequence with each other, for channeling the hot combustion gas 20 therethrough for extracting energy therefrom.

The airfoils 22 are configured as first stage nozzle vane airfoils circumferentially spaced apart from each other and extending radially between inner and outer vane sidewalls 30, 32 to define nozzle assembly 33. The nozzle assembly 33 receives the hot combustion gas 20 from the annular combustor cans 15 of the combustors 14. Airfoils 24 extend radially outwardly from the perimeter of a first supporting disk 34 to terminate adjacent first stage shroud assembly 35, and are configured as first stage turbine rotor blades which receive the hot combustion gas 20 from the first stage nozzle assembly 33 to rotate the disk 34 thereby extracting energy from the hot combustion gas.

The airfoils 25 are configured as second stage nozzle vane airfoils circumferentially spaced apart from each other and extending radially between inner and outer sidewalls 36 and 38 to define second stage nozzle assembly 41. The second stage nozzle assembly receives the hot combustion gas 20 from the first stage turbine rotor blades 24. Air foils 26 extend radially outwardly from a second supporting disc 40 to terminate adjacent second stage shroud assembly 45, and are configured as second stage turbine rotor blades for directly receiving combustion gas from the second stage nozzle assembly 41 for additionally extracting energy therefrom.

Similarly, the airfoils 27 are configured as third stage nozzle vane airfoils circumferentially spaced apart from each other and extending radially between inner and outer sidewalls 50 and 52 to define third stage nozzle assembly 56. The third stage nozzle assembly receives the combustion gas 20 from the second stage turbine rotor blades 26. Airfoils 28 extend radially outwardly from a third supporting disc 54 to terminate adjacent third stage shroud assembly 55, and are configured as third stage turbine rotor blades for receiving combustion gas from the third stage nozzle assembly 56 for additionally extracting energy therefrom. The number of stages utilized in multistage turbine 16 may vary depending upon the particular application of the gas turbine engine 10.

Since the turbine airfoils are exposed to the hot combustion gas 20 during turbine engine operation, they are typically cooled. For example, the airfoils are hollow and may include various internal cooling features. In an exemplary embodiment, a portion of the compressed air 18 is diverted from the compressor 12 and used as cooling air 19 which is channeled through the several airfoils for internal cooling.

Typically, the airfoils, sidewalls and shroud assemblies are film cooled. Cooling holes or apertures 42, FIGS. 5 and 6, extend through the airfoils and sidewalls to discharge the cooling air 19 into the gas flow path. The apertures 42 may be configured in rows of conventional film cooling holes or trailing edge holes, and may be disposed in either or both sidewalls of each airfoil. The apertures 42 shown in the figures are generally round but it should be understood that other cross-sections, such as diffuser-shaped, ovals or slots, for example, may also be used without departing from the scope of the invention.

The cooling air is discharged through the various apertures 42 to provide films of cooling air on the external surfaces of the airfoils, sidewalls and shrouds for protection from the hot combustion gas 20. Furthermore, during operation, the spatial temperature distribution of the combustion gas 20, discharged from the annular combustor cans 15 may vary radially and circumferentially.

Figure 3:
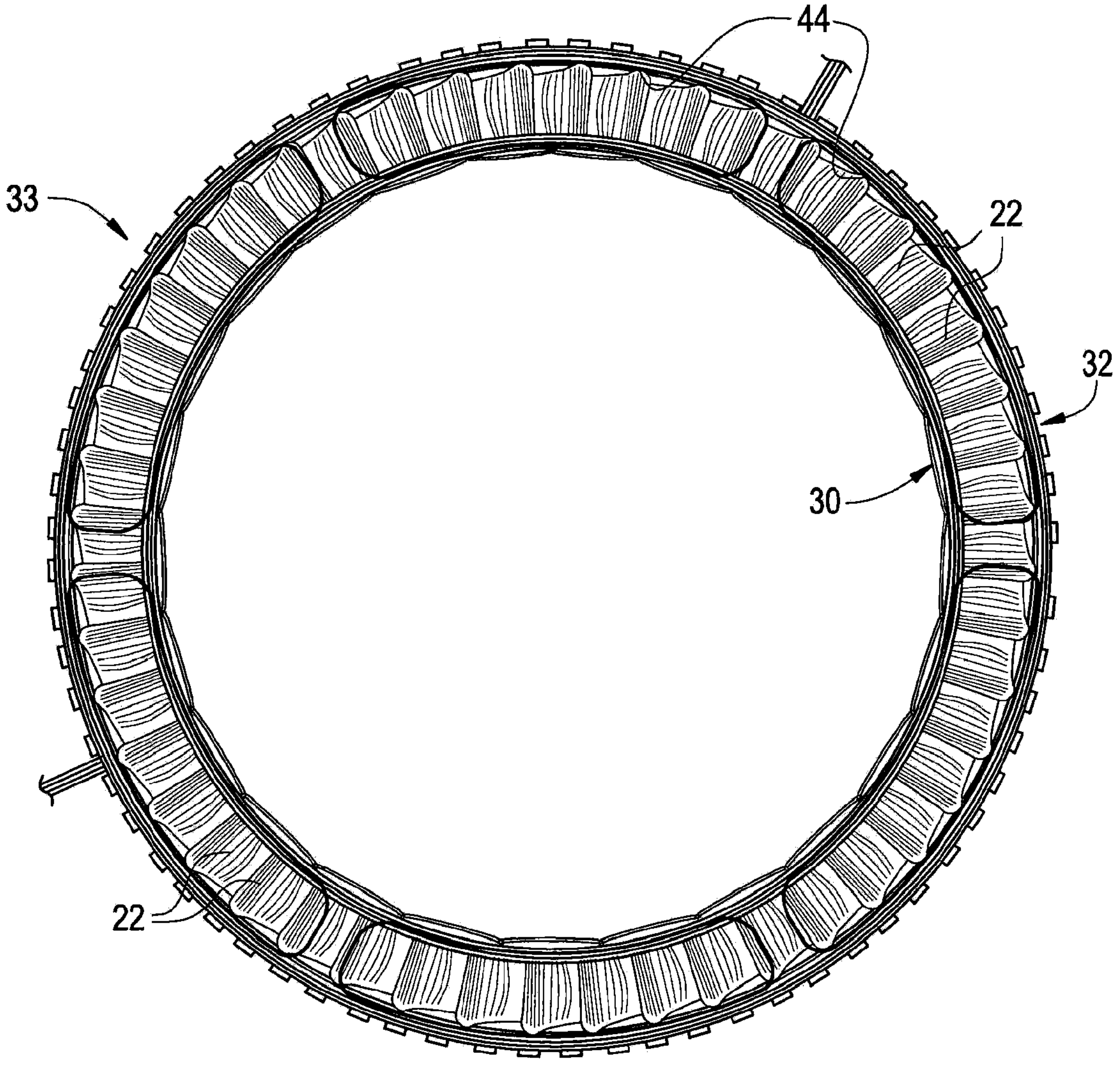
FIG. 3 is a view of a nozzle ring assembly taken along line 3-3 of FIG. 1, having upstream combustion can outlets shown in shadow.
Figure 4:
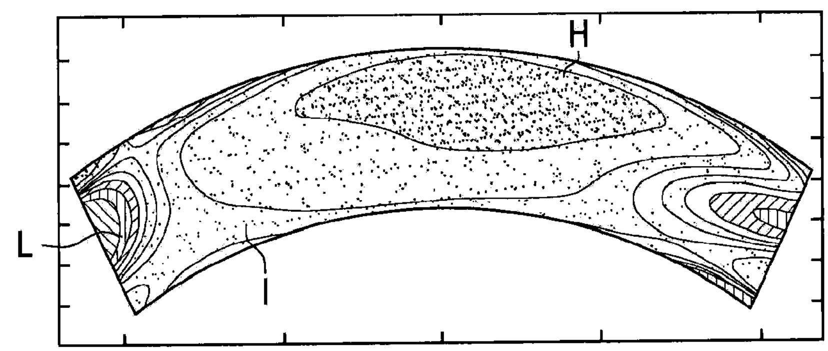
FIG. 4 is a temperature profile of the combustion gas exiting an individual combustion can aft frame illustrating regions of high ("H"), intermediate ("I") and low ("L") temperature.
Figure 5:
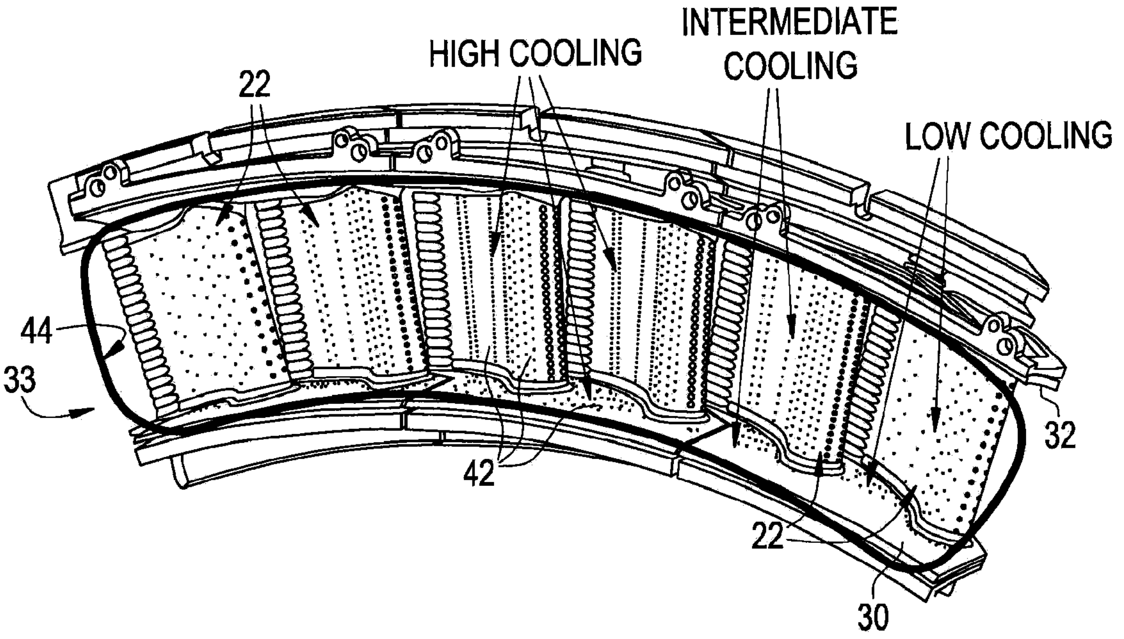
FIG. 5 is an enlarged view of a nozzle segment of FIG. 3 illustrating cooling features of one embodiment of the present invention.
Figure 6:
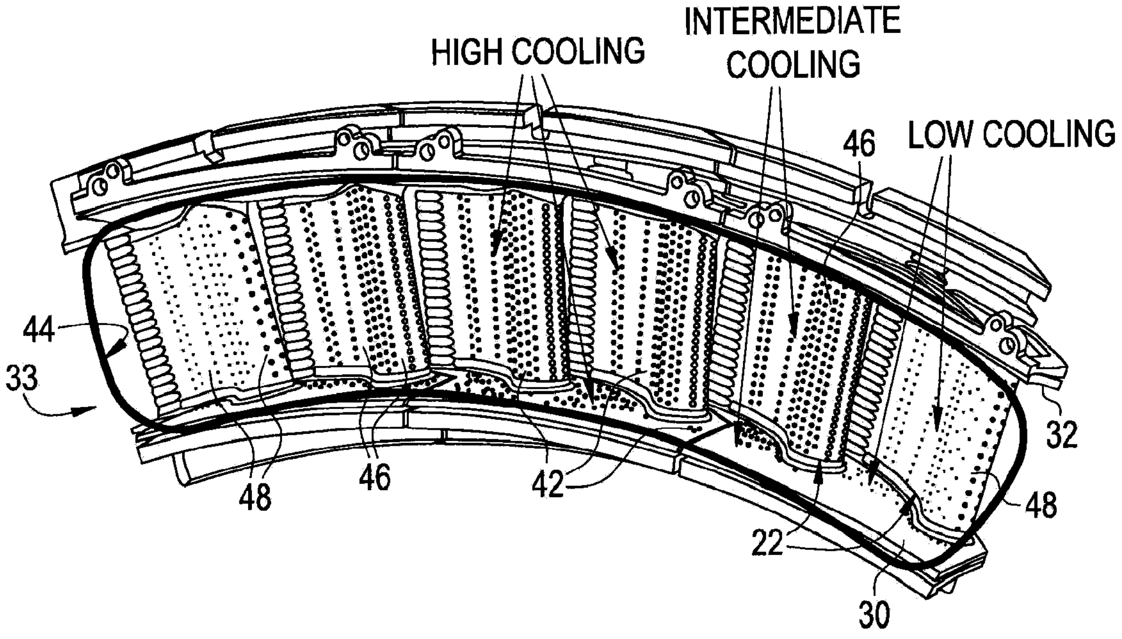
FIG. 6 is an enlarged view of a nozzle segment of FIG. 3 illustrating cooling features of another embodiment of the present invention.

Referring now to first stage nozzle assembly 33, FIGS. 3, 5 and 6, the first stage nozzle vane airfoils 22 are configured to channel the hot combustion gas 20 to the downstream first stage turbine airfoils 24, which extract energy therefrom. FIG. 4 illustrates an exemplary profile or distribution of the total relative temperature of the hot combustion gas 20, which varies circumferentially across each combustor can outlet 44. This exemplary temperature distribution may be analytically determined using three-dimensional (3-D) numerical computation. FIG. 4 illustrates isoclines of the different temperatures of the combustion gas from relatively hot "H", to intermediate "I", to relatively cool "C". The temperature differential can exceed 1000 F. As indicated, cooling air necessary for maintaining the turbine nozzle vane airfoils, sidewalls and shroud assemblies below certain limits is diverted from the compressor 12 and, therefore, has a direct influence on the efficiency of the turbine engine 10.

In an exemplary embodiment of the invention, and referring to the various stationary components of the first stage of turbine 16, it is contemplated to cool the nozzle vane airfoils 22 and sidewalls 30, 32 of nozzle assembly 33, as well as first stage shroud assembly 35 selectively, based upon the circumferential temperature profile or distribution of combustion gas 20 exiting the annular combustion cans 15 of the combustors 14. Referring again to FIG. 3, nozzle assembly 33 is shown, for purposes of illustration, with the profiles of an annular array of six circumferentially spaced combustor outlets 44, of the combustor cans 15 superimposed thereon. Each combustor outlet 44 delivers hot combustion gas 20 over a given circumferential span of the first stage nozzle assembly 33. By varying the aperture area, such as by varying the number, pattern and/or size of cooling holes 42 in the individual first stage nozzle vane airfoils 22, sidewalls 30, 32 and shroud assemblies 35, based on the location of the vanes relative to the circumferential temperature profile or distribution at each combustor nozzle outlet 44 of a can-annular combustion system of the type described, the cooling of the nozzle assembly 33 can be managed more efficiently. As is shown in FIG. 5, a relatively large number of cooling holes 42 are formed in the nozzle vane airfoils, sidewalls and shroud assemblies which correspond to the high temperature "H" section of the profile of FIG. 3 while a relatively smaller number of cooling holes 42 are placed in the intermediate "I" and cool "C" sections.

The result of selectively distributing the cooling holes 42 in the stationary turbine segments, based on the location of the vane airfoils, sidewalls and shroud assemblies relative to the circumferential temperature profile or distribution at the combustor outlet 44 of each combustor can 15, is that metal temperature differentials across the nozzle assembly 33 can be lowered, resulting in relatively uniform temperatures. Selective cooling of the first stage nozzle assembly 38 has the benefit of reducing the volume of bypassed, compressed air 18 required from the compressor 12 for cooling purposes, due to the reduced flow of air to the cooler regions of the nozzle airfoils, sidewalls and shrouds. The reduced cooling air requirement results in improved overall efficiency of the gas turbine engine 10.

In another exemplary embodiment of the invention it is contemplated to cool the stationary segments of the turbine 16 selectively, based upon the temperature profile or distribution of the hot combustion gas exiting the combustor cans 15 of the combustors 14. As shown in FIG. 6, where like numerals represent like components already described, varying aperture area such as by varying the relative size of the cooling holes or apertures 42 in the individual nozzle vane airfoils, sidewalls and shroud assemblies, based on the circumferential location of the components relative to the temperature profile or distribution at the combustor outlet 44 of each combustor can 15, the cooling of the nozzle assembly 33 can be managed more efficiently. The relative diameters of the cooling apertures 42 are increased at nozzle locations which correspond to the high temperature "H" section of the profile of FIG. 3, while the diameters of medium cooling holes 46, located in the intermediate "I" zones, and small cooling holes 48, located in the cool "C" sections, are reduced according to the specific cooling needs defined by the circumferential temperature profile.

The result of selectively varying the diameters of the cooling holes or apertures 42, 46, 48 of the stationary turbine segments, based on the circumferential location of the vanes relative to the temperature profile or distribution at the combustor outlet 44 of the combustor can 15, is that the overall temperature differentials across the nozzle assembly 33 can be lowered, resulting in relatively uniform nozzle temperatures. Selective cooling has the additional benefit of reducing the volume of compressed cooling air 18 required from the compressor 12 due to the reduced flow of cooling air to the cooler regions of the stationary components of the turbine 16. As indicated above, the lower cooling air requirement results in improved overall efficiency of the turbine engine 10.

While exemplary embodiments of the invention have been described with application to a first stage nozzle assembly of a multi-stage turbine, the scope of the invention is not intended to be limited to that single application. The application of selective cooling of gas turbine engine airfoils by varying the area of the cooling holes or apertures, based on the location of the vanes relative to the temperature profile or distribution, can be applied to the stationary components throughout the various turbine stages.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine engine comprising;

a turbine;

a combustor creating a combustion gas temperature profile, the combustion gas temperature profile having a high temperature region, an intermediate temperature region, and a low temperature region where the high temperature region is greater than the intermediate temperature region, and the intermediate temperature region is greater than the low temperature region;

a compressor for delivery of compressed air to the combustor wherein the combustor combusts fuel with the compressed air to deliver hot combustion gas through an outlet to the turbine;

stationary components including a nozzle assembly disposed in the turbine having vanes supported by sidewalls, for directing the hot combustion gas to downstream turbine blades;

cooling passages in the vanes and sidewalls configured to receive compressed air from the compressor; and cooling air apertures opening through outer walls of the vanes and sidewalls to release the cooling air, the apertures having an aperture distribution in the vanes and sidewalls related to the combustion gas temperature profile, with a larger aperture area placed in the high temperature region and a lower aperture area placed in the low temperature region such that the aperture distribution varies circumferentially between adjacent nozzle vanes across the nozzle assembly, the aperture distribution corresponding to the high temperature region, the intermediate temperature region and the low temperature region.

2. The turbine engine of claim 1 wherein the aperture area is varied by varying the number of the apertures.

3. The turbine engine of claim 1 wherein the stationary components include a shroud assembly disposed adjacent radially distal ends of turbine rotor blades.

4. A turbine engine comprising;

a turbine;

a can-annular combustion system comprising a plurality of circumferentially spaced combustors, having circumferentially spaced annular combustor can outlets, upstream of the turbine, the combustion system creating a combustion gas temperature profile, the combustion gas temperature profile having a high temperature region, an intermediate temperature region, and a low temperature region where the high temperature region is greater than the intermediate temperature region, and the intermediate temperature portion is greater than the low temperature region;

a compressor for delivery of compressed air to the combustors wherein the combustors combust fuel with the compressed air to deliver hot combustion gas through the spaced annular combustor can outlets to the turbine;

stationary components disposed in the turbine downstream of the spaced annular combustor can outlets;

cooling passages in the stationary components configured to receive compressed air from the compressor; and cooling air apertures opening through outer walls of the stationary components to release the cooling air, the apertures having a varied aperture area related to the combustion gas temperature profile of the hot combustion gas exiting the spaced annular combustor outlets, with a larger aperture area placed in the high temperature region and a lower aperture area placed in the low temperature region such that the aperture distribution varies circumferentially between adjacent nozzle vanes across the nozzle assembly, the aperture distribution corresponding to the high temperature region, the intermediate temperature region and the low temperature region.

5. The turbine engine of claim 4, the stationary components including a nozzle assembly having vanes supported by sidewalls.

6. The turbine engine of claim 4, the stationary components including a shroud assembly disposed adjacent to radially distal ends of turbine rotor blades.

7. The turbine engine of claim 4, wherein the aperture area is varied by varying the size of the apertures, and wherein the apertures are positioned through the outer walls of the vanes and sidewalls.

8. The turbine engine of claim 4, wherein the aperture area is varied by varying the number of the apertures.

9. A method for cooling stationary vanes, sidewalls and shrouds of a turbine, that receive hot combustion gas from an upstream combustor, comprising:

introducing compressed cooling air from a compressor into cooling air passages extending through the stationary vanes, sidewalls and shrouds;

creating a combustion gas temperature profile by the compressor, the combustion gas temperature profile having a high temperature region, an intermediate temperature region, and a low temperature region where the high temperature region is greater than the intermediate temperature region, and the intermediate temperature portion is greater than the low temperature region;

releasing the cooling air through apertures opening through outer walls of the stationary vanes, sidewalls and shrouds; and locating the apertures in relation to the combustion gas temperature profile of the hot combustion gas with a higher aperture area located in the high temperature regions and a lower aperture area placed in the low temperature regions such that the aperture distribution varies circumferentially between adjacent nozzle vanes across a nozzle assembly, the aperture distribution corresponding to the high temperature region, the intermediate temperature region and the low temperature region.

10. The method of cooling stationary vanes, sidewalls and shrouds of a turbine, according to claim 9, further comprising:

varying the aperture area by varying the number of apertures in relation to the temperature profile of the hot combustion gas, with more apertures placed in high temperature regions and fewer apertures placed in low temperature regions.

11. The method of cooling stationary vanes, sidewalls and shrouds of a turbine as described in claim 9, further comprising:

varying the aperture area by varying the size of apertures in relation to the temperature profile of the hot combustion gas with larger apertures placed in high temperature regions and smaller apertures placed in low temperature regions.

* * * * *